United States Patent
Kakuda et al.

(10) Patent No.: US 12,353,241 B1
(45) Date of Patent: Jul. 8, 2025

(54) ELECTRONIC DEVICES WITH DISPLAY SUPPORT STRUCTURES

(71) Applicant: Apple Inc., Cupertino, CA (US)

(72) Inventors: Tyler R. Kakuda, Stockton, CA (US); Daniel J. Barrett, Redwood City, CA (US); Michael J. Brown, Campbell, CA (US); Hao Dong, San Jose, CA (US); David A. Doyle, Cupertino, CA (US); Jean-Pierre S. Guillou, Los Gatos, CA (US); Erik G. de Jong, San Francisco, CA (US); James P. Landry, Campbell, CA (US); Di Liu, San Jose, CA (US); Kiran S. Pillai, San Bruno, CA (US); Yi Qiao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 302 days.

(21) Appl. No.: 16/989,764

(22) Filed: Aug. 10, 2020

Related U.S. Application Data

(60) Provisional application No. 62/905,844, filed on Sep. 25, 2019.

(51) Int. Cl.
   *G06F 1/16* (2006.01)
   *G02B 1/14* (2015.01)
   *G06F 1/18* (2006.01)

(52) U.S. Cl.
   CPC ............ *G06F 1/1609* (2013.01); *G02B 1/14* (2015.01); *G06F 1/181* (2013.01)

(58) Field of Classification Search
   CPC .......... G06F 1/1609; G06F 1/181; G02B 1/14
   See application file for complete search history.

(56) References Cited

U.S. PATENT DOCUMENTS

| | | | | |
|---|---|---|---|---|
| 8,206,047 B1* | 6/2012 | Isaac | ................... | G06F 3/04886 |
| | | | | 400/490 |
| 9,356,087 B1* | 5/2016 | Lee | ...................... | H01L 27/1218 |
| 10,405,446 B2* | 9/2019 | Choi | ........................ | H05K 5/03 |
| 10,674,572 B2* | 6/2020 | Cho | ........................ | H04M 1/02 |
| 10,885,875 B2* | 1/2021 | Lin | ........................ | G02B 3/005 |
| 10,903,445 B2* | 1/2021 | Baek | ....................... | H10K 50/84 |
| 10,910,589 B2* | 2/2021 | Jeong | ..................... | H10K 50/84 |
| 11,157,120 B2* | 10/2021 | Hong | .................... | G06F 3/0412 |

(Continued)

FOREIGN PATENT DOCUMENTS

JP  2006349788 A  12/2006

*Primary Examiner* — Abhishek M Rathod
(74) *Attorney, Agent, or Firm* — Treyz Law Group, P.C.; Kendall P. Woodruff

(57) ABSTRACT

An electronic device may include a display, a cover layer overlapping the display, and a housing have housing sidewalls. An encapsulant material may surround at least part of the display and may be used to couple the cover layer to the housing sidewalls. A rigid outer material having a higher elastic modulus than the encapsulant material may also be used to couple the cover layer to the housing sidewalls. The rigid outer material may be a molded material that surrounds an outer perimeter of the encapsulant, or the rigid outer material may be a metal or plastic frame member having a C-shaped cross-section or other geometry. The display may overlap the housing sidewall. The encapsulant may absorb mechanical stresses on the cover layer to protect the display, whereas the rigid outer material may transfer mechanical stresses on the cover layer to the housing.

19 Claims, 5 Drawing Sheets

(56) References Cited

U.S. PATENT DOCUMENTS

| | | | |
|---|---|---|---|
| 11,216,094 B2* | 1/2022 | Ahn | G06F 1/203 |
| 2007/0193100 A1* | 8/2007 | Rieiveld | G09F 19/22 |
| | | | 40/790 |
| 2010/0285260 A1* | 11/2010 | Bookbinder | B32B 17/10 |
| | | | 428/45 |
| 2011/0260959 A1* | 10/2011 | Son | G02F 1/133308 |
| | | | 361/679.01 |
| 2014/0131897 A1 | 5/2014 | Yu et al. | |
| 2014/0265821 A1* | 9/2014 | Malon | G06F 1/1626 |
| | | | 361/679.01 |
| 2014/0306941 A1* | 10/2014 | Kim | H10K 59/131 |
| | | | 345/204 |
| 2014/0364178 A1* | 12/2014 | Hynecek | G06F 1/1637 |
| | | | 455/575.8 |
| 2015/0049433 A1* | 2/2015 | Berg | B29C 45/14 |
| | | | 361/679.55 |
| 2017/0218232 A1* | 8/2017 | Niwa | B32B 29/002 |
| 2017/0263873 A1* | 9/2017 | Zhang | H01L 23/5387 |
| 2017/0263885 A1* | 9/2017 | Sun | H10K 50/8426 |
| 2018/0084680 A1* | 3/2018 | Jarvis | H05K 1/148 |
| 2018/0364846 A1* | 12/2018 | Ahn | G06F 1/1643 |
| 2019/0254129 A1* | 8/2019 | Cho | H05B 33/04 |
| 2019/0296259 A1* | 9/2019 | Baek | G06F 3/041 |
| 2019/0304404 A1* | 10/2019 | Lin | G09G 5/10 |
| 2020/0136069 A1* | 4/2020 | Paek | B32B 3/08 |
| 2020/0185641 A1* | 6/2020 | Jeong | H10K 77/111 |
| 2021/0165456 A1* | 6/2021 | Gao | H10K 77/111 |

* cited by examiner

ELECTRONIC DEVICES WITH DISPLAY SUPPORT STRUCTURES

This application claims the benefit of U.S. provisional patent application No. 62/905,844, filed Sep. 25, 2019, which is hereby incorporated by reference herein in its entirety.

FIELD

This relates generally to electronic devices with displays, and, more particularly, to displays with support structures.

BACKGROUND

Electronic devices often include displays. Displays may be protected using cover layers. For example, a cover glass layer may be attached to the front of a display to prevent layers in the display from being damaged.

Challenges arise when mounting display components such as displays and display cover layers in electronic devices. If care is not taken, the display components and display support structures may be overly bulky or may be characterized by excessively wide inactive border regions.

SUMMARY

An electronic device may include a display, a cover layer overlapping the display, and a housing have housing sidewalls. An encapsulant material may surround at least part of the display and may be used to couple the cover layer to the housing sidewalls. A rigid outer material having a higher elastic modulus than the encapsulant material may also be used to couple the cover layer to the housing sidewalls. The rigid outer material may be a molded material that surrounds an outer perimeter of the encapsulant, or the rigid outer material may be a metal or plastic frame member having a C-shaped cross-section or other cross-sectional shape.

The display may overlap the housing sidewall and may form part of the stack of layers that couples the cover layer to the housing sidewall. This allows the active area of the display to extend close to the edges of the electronic device. The soft encapsulant that encapsulates part of the display may absorb mechanical stresses on the cover layer to protect the display, whereas the rigid outer material may transfer mechanical stresses on the cover layer to the housing.

The display may have a curved portion that is at least partially surrounded by the soft encapsulant. The curved portion may be interposed between the cover layer and the housing sidewall. The encapsulant may have a chamfered edge, a stepped edge, or other edge geometry that mates with corresponding edge geometry of the housing sidewall.

An image transport material may be interposed between the display and the cover layer. The image transport material may have straight or curved optical structures that transport an image generated by the display from an input surface to an output surface.

DETAILED DESCRIPTION

An electronic device may have a display. The display may have an array of pixels for creating an image. The image may pass through a protective display cover layer that overlaps the array of pixels.

It may be desirable to minimize the inactive border around the array of pixels. This can be accomplished by bending display layers so that circuitry at the edges of the display layers are hidden behind the active area. Another way to minimize inactive borders of a display is to expand image size and/or to otherwise optically modify an image presented on the array of pixels, particularly along the one or more peripheral edges of the array of pixels. This can be accomplished by incorporating display border structures formed from image transport material into the electronic device.

For example, to minimize inactive display borders, one or more borders of a pixel array may be provided with a strip of image transport material. The image transport material, which may sometimes be referred to as image transport layer material, may be formed from Anderson localization material or a coherent fiber bundle. The image transport material may receive an image from a display at an input surface and may provide the image to a corresponding output surface for viewing by a user.

Display cover layers may be mounted over display layers such as bent display layers and/or display layers with image transport material. A display cover layer may be mounted to housing structures at the periphery of the display using one or more layers of adhesive. Care must be taken to ensure that display cover layers are mounted in such a way as to provide sufficient protection for the display while also minimizing the inactive border region. This can be achieved using display support structures with different elasticity values and/or using encapsulation material to support the display and cover layer. In some arrangements, display layers may extend into and/or may form part of the stack of layers that attach the display cover layer to the housing sidewall, allowing the active area to extend closer to the outer edges of the device.

Figure 1:
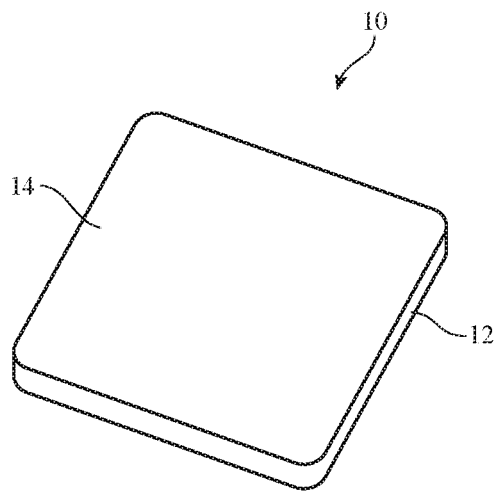
FIG. 1 is a perspective view of an illustrative electronic device having a display in accordance with an embodiment.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, wrist device, or other portable computing device. Other configurations may be used for device 10 if desired. The example of FIG. 1 is merely illustrative.

In the example of FIG. 1, device 10 includes a display such as display 14 mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from organic light-emitting diodes (e.g., a thin-film organic light-emitting diode display), liquid crystal display (LCD) components, an array of electrophoretic display pixels, an array of plasma display pixels, microelectromechanical (MEMs) shutter pixels, electrowetting pixels, micro-light-emitting diodes (small crystalline semiconductor die), quantum dot light-emitting diodes, or display pixels based on other display technologies. The array of display pixels may display images for a user in active area of display 14. In some arrangements, the active area may be surrounded on one or more sides by an inactive border region. In other arrangements, display 14 may be borderless or nearly borderless (e.g., where inactive border regions have been eliminated or minimized).

Display 14 may be protected using a display cover layer such as a layer of transparent glass, polymer, or crystalline material such as sapphire. Openings may be formed in the display cover layer. For example, an opening may be formed in the display cover layer to accommodate a button, a speaker port, or other component. Openings may be formed in housing 12 to form communications ports (e.g., an audio jack port, a digital data port, etc.), to form openings for buttons, etc.

Figure 2:
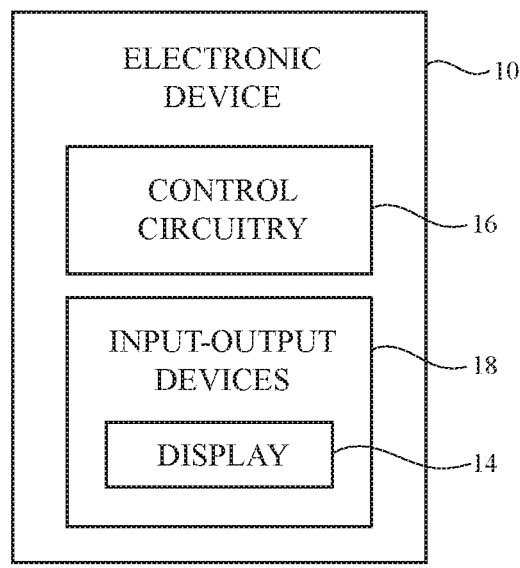
FIG. 2 is a schematic diagram of an illustrative electronic device having a display in accordance with an embodiment.

FIG. 2 is a schematic diagram of device 10. As shown in FIG. 2, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 18 may be used to allow data to be supplied to device 10 and to allow data to be provided from device 10 to external devices. Input-output devices 18 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 18 and may receive status information and other output from device 10 using the output resources of input-output devices 18. Input-output devices 18 may include one or more displays such as display 14.

Control circuitry 16 may be used to run software on device 10 such as operating system code and applications. During operation of device 10, the software running on control circuitry 16 may display images on display 14 using an array of pixels in display 14.

Display 14 may have a rectangular shape (i.e., display 14 may have a rectangular footprint and a rectangular peripheral edge that runs around the rectangular footprint) or may have other suitable shapes. Display 14 may be planar, may have a curved profile, and/or may have planar portions and curved portions.

Figure 3:
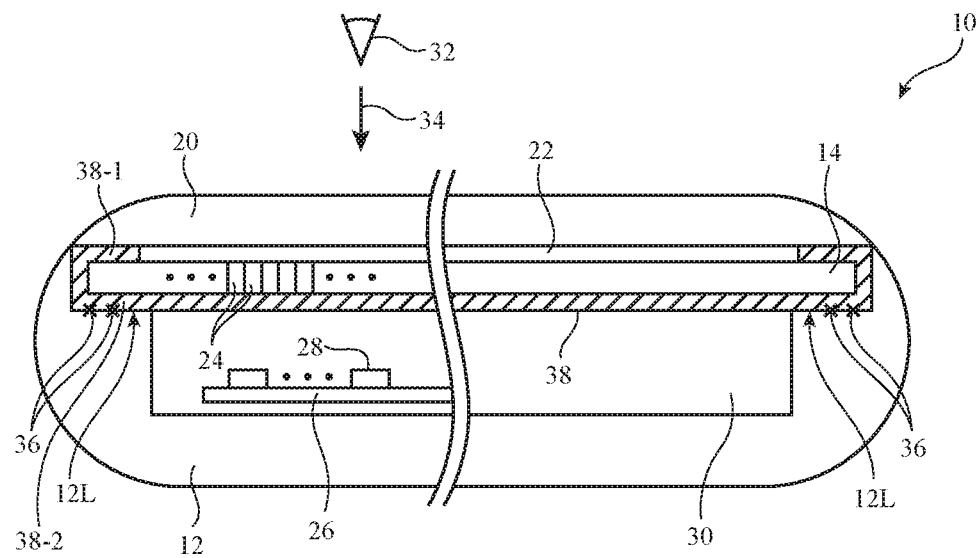
FIG. 3 is a cross-sectional side view of an illustrative electronic device having display support structures in accordance with an embodiment.

A cross-sectional side view of a portion of an illustrative electronic device with a display, a display cover layer, and display support structures is shown in FIG. 3.

Device 10 includes a housing such as housing 12. Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose one or more interior regions such as interior region 30 and may separate interior region 30 from the exterior region surrounding device 10.

As an example, housing 12 may include metal sidewall structures such as vertical metal walls or other suitable housing structures. The metal walls may run around the periphery of electronic device housing 12 and may sometimes be referred to as a peripheral metal band or peripheral conductive housing structures. This is, however, merely illustrative. Housing 12 may have sidewalls formed from glass, polymer, or crystalline material such as sapphire.

In the example of FIG. 3, the sidewalls of device housing 12 are curved. For example, the sidewalls of housing 12 may have curved outer surfaces that abut the curved outer surfaces of cover layer 20. Arrangements in which the sidewalls of housing 12 have planar outer surfaces may also be used.

Electrical components 28 may be mounted in interior region 30. Electrical components 28 may include integrated circuits, discrete components, light-emitting components, sensors, and/or other circuits and may, if desired, be interconnected using signal paths in one or more printed circuits such as printed circuit 26. If desired, one or more portions of the housing walls may be transparent (e.g., so that light associated with an image on a display or other light-emitting or light-detecting component can pass between interior region 30 and the exterior region outside of device 10).

Electrical components 28 may include control circuitry (e.g., control circuitry 16 of FIG. 2). The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices. Wireless communications circuitry may, for example, wirelessly transmit control signals and other information to external equipment in response to receiving user input or other input from sensors or other devices in components 28.

Components 28 may include input-output circuitry (e.g., input-output devices 18 of FIG. 2). The input-output circuitry in components 28 of device 10 may be used to allow data to be supplied to device 10 and to allow data to be provided from device 10 to external devices. The input-output circuitry may include input devices that gather user input and other input and may include output devices that supply visual output, audible output, or other output.

Output may be provided using light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 28) may include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 28 may include mechanical devices for gathering input (e.g., buttons, joysticks, scrolling wheels, key pads with movable keys, keyboards with movable keys, and other devices for gathering user input). During operation, device 10 may use sensors and/or other input-output devices in components 28 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, an audio component, or other input-output device in housing 12, etc.).

If desired, electronic device 10 may include a battery or other energy storage device, connector ports for supporting wired communications with ancillary equipment and for receiving wired power, and other circuitry. In some configurations, device 10 may serve as an accessory and/or may include a wired and/or wireless accessory (e.g., a keyboard, computer mouse, remote control, trackpad, etc.).

Device 10 may include one or more displays. The displays may, for example, include an organic light-emitting diode display, a liquid crystal display, a display having an array of pixels formed from respective light-emitting diodes (e.g., a pixel array having pixels with crystalline light-emitting diodes formed from respective light-emitting diode dies such as micro-light-emitting diode dies), and/or other displays. The displays may include rigid display structures and/or may be flexible displays. For example, a light-emitting diode display may be sufficiently flexible to be bent. Displays for device 10 may have pixel arrays for displaying images for a user. Each pixel array may be mounted under a transparent display cover layer that helps to protect the pixel array. In the example of FIG. 3, display 14 (which may sometimes be referred to as a pixel array, display panel, display layer, or display substrate) has an array of pixels 24 and is mounted under display cover layer 20.

Display cover layer 20, which may sometimes be referred to as a transparent housing structure or display cover structure, may be coupled to opaque housing structures and/or transparent housing structures (see, e.g., the walls of housing 12 of FIG. 3). Display cover layer 20 may include one or more transparent materials such as polymer, glass, crystalline material such as sapphire, etc. This allows a user such as viewer 32 who is viewing display 14 in direction 34 to view an image on display 14. Display cover layer 20 may be attached to display 14 using adhesive (e.g., using adhesive 22 formed from polymer such as a thin layer of optically clear adhesive).

As shown in FIG. 3, device 10 may include display support structures such as encapsulant material 38. Encapsulant material 38 may be a polymer structure that completely or partially encapsulates display 14 to provide mechanical robustness, protection from moisture and other environmental contaminants, heat sinking, and/or electrical insulation. Encapsulant material 38 (sometimes referred to as potting material, encapsulation, molding, etc.) may be formed from molded polymer (e.g., injection-molded plastic, transfer molded plastic, low-pressure molded plastic, low-pressure molded plastic, reaction molded plastic, two-part molded plastic, etc.) that has been molded over display 14, may be formed from polymer that is used as a gap fill, may be formed from molded polymer that is pre-formed into the desired shape and subsequently attached to display 14, and/or may be formed using other suitable methods. Illustrative materials that may be used to form encapsulant material 38 include epoxy, polyamide, polyurethane, silicone, other suitable materials, or a combination of any two or more of these materials. Encapsulant material 38 may completely or partially surround display 14.

In addition to increasing the robustness of display 14 (e.g., by protecting display 14 during a drop event and preventing ingress of moisture and contaminants), encapsulant material 38 may allow the active area of the display to extend closer to the outer edges of device 10. In particular, display cover layer 20 and/or housing 12 may be mounted to opposing sides of encapsulant material 38, thereby allowing display 14 to extend into (and therefore form part of) the stack of layers that attaches and/or couples cover layer 20 to the sidewalls housing 12 (e.g., to housing ledges such as housing ledge 12L, which may be part of the sidewalls of housing 12). As shown in FIG. 3, for example, encapsulant material 38 has a first portion 38-1 interposed between display 14 and cover layer 20 and a second portion 38-2 interposed between display 14 and housing ledge 12L. The upper surface of encapsulant material 38 may be attached to the inner surface of cover layer 20, the lower surface of encapsulant material 38 may be attached to housing ledge 12L, and display 14 may be interposed between first portion 38-1 and second portion 38-2 of encapsulant 38. If desired, one or more adhesive layers such as adhesive 36 may be used to attach encapsulant material 38 to housing 12 and/or to cover layer 20. Extending display 14 so that it is part of the stack of layers attaching cover layer 20 to housing ledge 12L may help reduce the required clearance between display 14 and housing 12, which in turn reduces the inactive border area around display 14.

Figure 4:
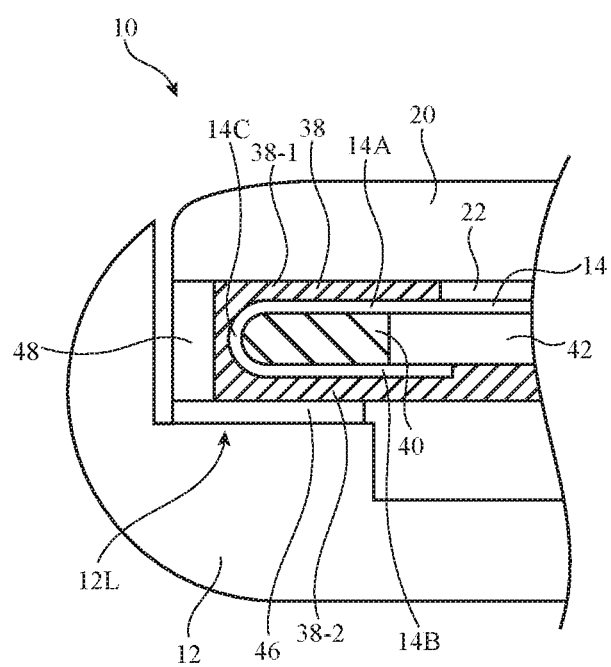
FIG. 4 is a cross-sectional side view of an illustrative electronic device having display support structures with different elasticity values in accordance with an embodiment.

FIG. 4 is a cross-sectional side view of an illustrative arrangement that may be used for a display that includes one or more bent edges. As shown in FIG. 4, display 14 may have active portion 14A, inactive portion 14B, and curved portion 14C between active portion 14A and inactive portion 14B. Active portion 14A of display 14 may include an array of pixels (e.g., pixels 24 of FIG. 3) for displaying images.

Portion 14B may be bent behind portion 14A and may be secured to the underside of portion 14A using layers such as layers 40 and 42. Layer 42 may be a foam adhesive, a layer of pressure sensitive adhesive, or other suitable adhesive. If desired, layer 42 may include a foam adhesive interposed between one or more polymer layers and one or more additional adhesive layers. The thickness of layer 42 may be 30-250 microns, more than 25 microns, or less than 300 microns. Using an arrangement of the type shown in FIG. 4, display thickness can be minimized by allowing the display to be folded over against itself and attached together with adhesive (i.e., by allowing portion 14B to be folded and secured against portion 14A without use of a mandrel). This is, however, merely illustrative. If desired, display 14 may be bent around a mandrel or other support structure.

Layer 40 may be a rigid polymer (e.g., a material having a relatively high elasticity modulus) that supports curved portion 14C of display 14. Layer 40 (sometimes referred to as potting material, encapsulation, molding, etc.) may be formed from molded polymer (e.g., injection-molded plastic, transfer molded plastic, low-pressure molded plastic, low-pressure molded plastic, reaction molded plastic, two-part molded plastic, etc.) that has been molded over the interior (concave) portion of curved portion 14C, may be formed from polymer that is used as a gap fill, may be formed from molded polymer that is pre-formed into the desired shape and subsequently attached to display 14 (e.g., by bending display 14 around material 40), and/or may be formed using other suitable methods. This is, however, merely illustrative. If desired, layer 40 may be a soft polymer or other suitable material, or may be omitted (e.g., so that an air gap separates layer 42 from curved portion 14C).

To mount display 14 and cover layer 20 to housing 12, it may be desirable to use a combination of materials with different elasticity values to selectively provide cushioning and rigidity in different locations. For example, it may be desirable to use a more flexible material (e.g., having a relatively low modulus of elasticity) between cover layer 20 and display 14 so that impact events on cover layer 20 are absorbed in the flexible material and do not damage display 14. On the other hand, it may be desirable to use a more rigid material (e.g., having a relatively high modulus of elasticity) between cover layer 20 and housing 12 so that mechanical stresses from impact events are absorbed by housing 12 and not by display 14.

In the example of FIG. 4, display support structures include encapsulant 38 having a first elasticity modulus E1 and encapsulant 48 having a second elasticity modulus E2, which may be greater than E1. Both encapsulant 38 and encapsulant 48 form part of the stack of layers that couple display cover layer 20 to housing ledge 12L. A layer of adhesive such as adhesive 46 may be used to attach encapsulants 38 and 48 to housing ledge 12L. If desired, adhesive 46 may be formed from a material having a relatively low modulus of elasticity to serve as a shock absorber. The use of adhesive is merely illustrative, however. If desired, adhesive 46 may be replaced or supplemented by other attachment structures such as welds, solder, screws, clips, rivets, or other fasteners, overmolded plastic, or other connection mechanisms.

Encapsulant material 48 (sometimes referred to as potting material, encapsulation, molding, etc.) may be formed from molded polymer (e.g., injection-molded plastic, transfer molded plastic, low-pressure molded plastic, low-pressure molded plastic, reaction molded plastic, two-part molded plastic, etc.) that has been molded around one or more sides of display 14, may be formed from polymer that is used as a gap fill, may be formed from molded polymer that is pre-formed into the desired shape and subsequently attached to display 14, and/or may be formed using other suitable methods. Illustrative materials that may be used to form encapsulant material 48 include epoxy, polyamide, polyurethane, silicone, other suitable materials, or a combination of any two or more of these materials. Encapsulant material 48 may completely or partially surround display 14.

Because encapsulant material 48 is more rigid than encapsulant material 38, encapsulant material 48 may help ensure that mechanical stresses on cover layer 20 are transferred to housing 12 and/or shock-absorbing adhesive 46 through material 48 and not through display 14. As shown in FIG. 4, there is a greater distance between display 14 and cover layer 20 than between encapsulant material 48 and cover layer 20, which also helps ensure that shocks to cover layer 20 are transferred through encapsulant material 48 and not display 14. Because encapsulant 38 is formed using a soft material (e.g., a material with a low elasticity modulus), encapsulant 38 may help absorb mechanical stresses on cover layer 20, thereby protecting underlying layers of display 14.

As shown in FIG. 4, display 14 extends into and may form part of the stack of layers that attach cover layer 20 to the sidewalls of housing 12 (e.g., to housing sidewall ledge 12L). Portion 38-1 of encapsulant 38 is interposed between display portion 14A and cover layer 20. Portion 38-2 of encapsulant 38 is interposed between display portion 14B and housing ledge 12L. By extending display 14 so that it overlaps housing sidewall ledges 12L, the active area of display 14 may extend closer to the outer edges of device 10 and the inactive border region may be reduced or eliminated.

Encapsulant materials 38 and 48 may extend around one or more sides of display 14. In one suitable arrangement, soft encapsulant material 38 extends along all four edges of the display and across the center of display 14, and rigid encapsulant material 48 forms a ring or loop (e.g., a rectangular ring or loop) that surrounds the outer periphery of soft encapsulant material 38. The combination of rigid and soft materials between cover layer 20 and housing sidewall ledge 12L helps increase the robustness of display 14 while also expanding the active area of the display 14. This is, however, merely illustrative. If desired, encapsulant material 38 may only be located along the outer edges of display 14 and may not extend across the center of the display.

Figure 5:
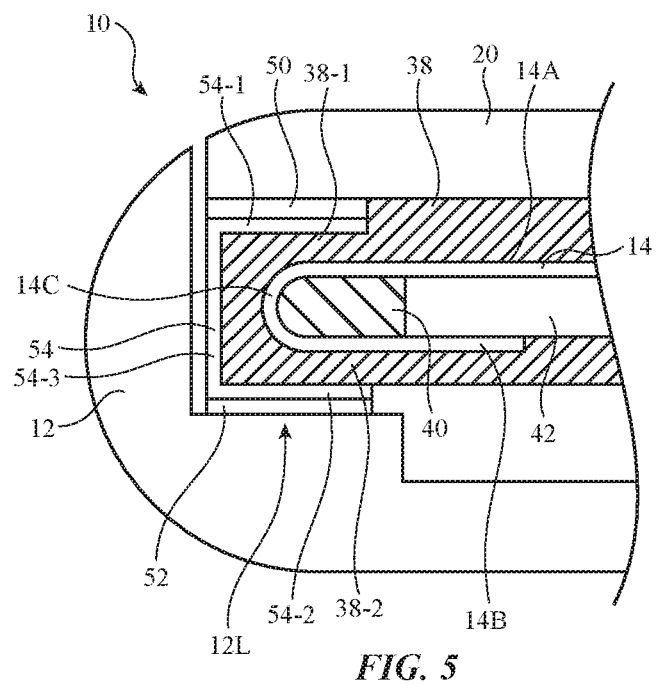
FIG. 5 is a cross-sectional side view of an illustrative electronic device having display support structures such as an encapsulation material and a frame member in accordance with an embodiment.

FIG. 5 is a cross-sectional side view of another illustrative arrangement that may be used for a display that includes one or more bent edges. As shown in FIG. 5, display 14 may have active portion 14A, inactive portion 14B, and curved portion 14C between active portion 14A and inactive portion 14B. Active portion 14A of display 14 may include an array of pixels (e.g., pixels 24 of FIG. 3) for displaying images.

Portion 14B may be bent behind portion 14A and may be secured to the underside of portion 14A using layers such as layers 40 and 42 (similar to the arrangement of FIG. 4).

As in the example of FIG. 4, it may be desirable to use a more flexible material (e.g., having a relatively low modulus of elasticity) between cover layer 20 and display 14 so that impact events on cover layer 20 are absorbed in the flexible material and do not damage display 14. On the other hand, it may be desirable to use a more rigid material (e.g., having a relatively high modulus of elasticity) between cover layer 20 and housing 12 so that mechanical stresses from impact events are absorbed by housing 12 and not by display 14.

In the example of FIG. 5, display support structures include encapsulant 38 having a first elasticity modulus E1 and frame member 54 having a second elasticity modulus E3, which may be greater than E1. Both encapsulant 38 and frame member 54 form part of the stack of layers that attach display cover layer 20 to housing ledge 12L. A layer of adhesive such as adhesive 52 may be used to attach frame member 54 to housing ledge 12L. An additional layer of adhesive such as adhesive 50 may be used to attach frame member 54 to cover layer 20. If desired, adhesive 52 and/or adhesive 50 may be formed from a material having a relatively low modulus of elasticity to serve as a shock absorber. The use of adhesive is merely illustrative, however. If desired, adhesive 50 and/or adhesive 52 may be replaced or supplemented by other attachment structures such as welds, solder, screws, clips, rivets, or other fasteners, overmolded plastic, or other connection mechanisms.

Frame member 54 (sometimes referred to as a support structure) may be formed from plastic, metal, glass, ceramic, fiber-based materials, other materials, or combinations of these materials. As shown in FIG. 5, frame member 54 may have a C-shaped cross-section and may include a first portion 54-1 interposed between cover layer 20 and encapsulant material 38, a second portion 54-2 interposed between encapsulant material 38 and housing ledge 12L, and a third portion 54-3 that extends vertically between cover layer 20 and housing ledge 12L. If desired, one or both of horizontal portions 54-1 and 54-2 of frame member 54 may overlap a portion of display 14. Frame member 54 may completely or partially surround display 14. The C-shaped geometry of frame member 54 shown in FIG. 5 is merely illustrative. If desired, frame member 54 may have other cross-sectional shapes (e.g., a curved cross-sectional shape, a cross-sectional shape in which one or both of horizontal portions 54-1 and 54-2 are omitted, etc.).

Because frame member 54 is more rigid than encapsulant material 38, frame member 54 may help ensure that mechanical stresses on cover layer 20 are transferred to housing 12 and/or shock-absorbing adhesive 52 through frame member 54 and not through display 14. As shown in FIG. 5, there is a greater distance between display 14 and cover layer 20 than between frame member 54 and cover layer 20, which also helps ensure that shocks to cover layer 20 are transferred through frame member 54 and not display 14.

As shown in FIG. 5, display 14 extends into and may form part of the stack of layers that attach and/or couple cover layer 20 to the sidewalls of housing 12 (e.g., to housing sidewall ledge 12L). Portion 38-1 of encapsulant 38 is interposed between display portion 14A and upper portion 54-1 of frame member 54. Portion 38-2 of encapsulant 38 is interposed between display portion 14B and lower portion 54-2 of frame member 54. By extending display 14 so that it overlaps housing sidewall ledges 12L, the active area of display 14 may extend closer to the outer edges of device 10 and the inactive border region may be reduced or eliminated.

Encapsulant material 38 and frame member 54 may extend around one or more sides of display 14. In one suitable arrangement, soft encapsulant material 38 extends along all four edges of the display and across the center of display 14, and rigid outer frame member 54 forms a ring or loop (e.g., a rectangular ring or loop) that surrounds the outer periphery of soft encapsulant material 38. The combination of rigid and soft materials between cover layer 20 and housing sidewall ledge 12L helps increase the robustness of display 14 while also expanding the active area of the display 14. This is, however, merely illustrative. If desired, encapsulant material 38 may only be located along the outer edges of display 14 and may not extend across the center of the display.

Figure 6:
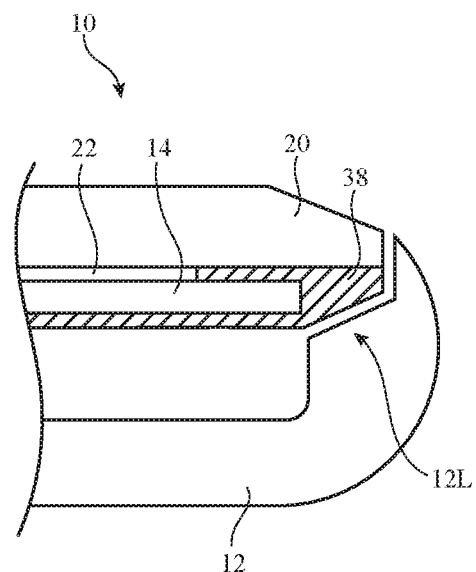
FIG. 6 is a cross-sectional side view of an illustrative electronic device having an encapsulation material with a chamfered edge in accordance with an embodiment.

FIG. 6 is a cross-sectional side view of an illustrative electronic device showing how attachment features may be integrated into encapsulant materials. In one illustrative arrangement, the edge of display 14 that is shown in FIG. 6 is not bent, but the opposing edge of display 14 (not shown in FIG. 6) is bent (e.g., as shown in the examples of FIGS. 4 and 5). This is, however, merely illustrative. If desired, display 14 of FIG. 6 may have one or more bent edges, may be a display without bent edges, may be a display that includes image transport material for optically modifying images, and/or may be any other suitable type of display.

Figure 7:
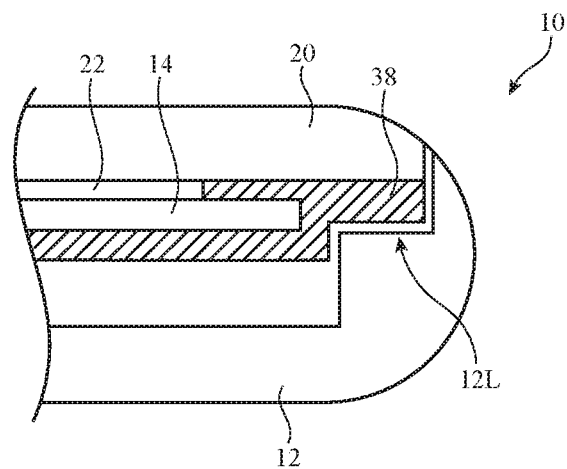
FIG. 7 is a cross-sectional side view of an illustrative electronic device having an encapsulation material with a stepped edge in accordance with an embodiment.

As shown in FIG. 6, housing sidewall ledge 12L has a chamfered edge, and encapsulant material 38 has a corresponding chamfered edge that mates with the chamfered edge of housing sidewall ledge 12L. FIG. 7 shows an example in which housing sidewall ledge 12L has a stepped edge, and encapsulant material 38 has a corresponding stepped edge that mates with the stepped edge of housing sidewall ledge 12L.

The examples of FIGS. 6 and 7 are merely illustrative. If desired, encapsulant material 38 may have other edge geometries to mate with different geometries of housing 12. Incorporating attachment or integration features into material 38 may improve the mechanical interlocking between material 38 and housing 12. Edge shapes such as chamfered edges, stepped edges, and other geometries may be formed using a mold that imparts the desired shape onto the edge of material 38, or may be formed by cutting or removing material from encapsulant 38 after encapsulant 38 has been molded onto display 14.

Figure 8:
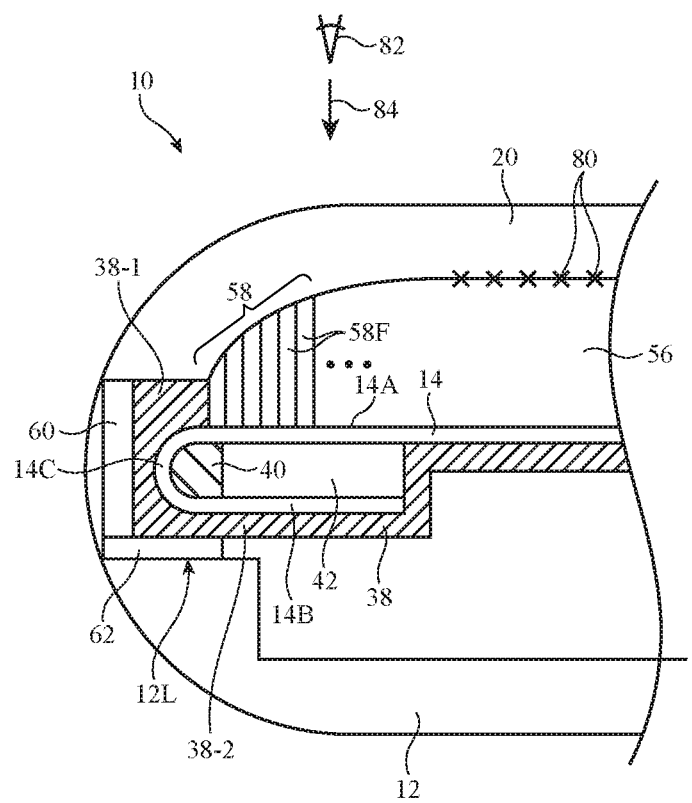
FIG. 8 is a cross-sectional side view of an illustrative electronic device having image transport material and display support structures with different elasticity values in accordance with an embodiment.

FIG. 8 is a cross-sectional side view of an illustrative arrangement that may be used for a display that includes image transport material.

As shown in FIG. 8, the display cover structures may include an outer display cover layer portion such as outer display cover layer 20, a central inner display cover layer portion such as inner display cover layer 56, and image transport border structure 58. Display cover layers 20 and 56 may be formed from clear material such as a layer (plate) of clear polymer, glass, crystalline material such as sapphire, etc. Layers 20 and 56 may be separate layers that are attached to each other (e.g., using adhesive 80 formed from polymer such as a thin layer of optically clear adhesive) or layer 56 may be formed as an integral portion of layer 20.

Border structure 58 may be formed from image transport material and may extend in a strip around the periphery of layer 56. For example, in configurations in which layer 56 has a rectangular footprint (outline when viewed from above in direction 84), border structure 58 may have a rectangular ring shape that surrounds layer 56. Border structure 58 may have input and output surfaces of any suitable shape. As shown in FIG. 8, for example, the input surface of border structure 58 may be planar and may rest against a planar peripheral edge portion of display 14 to receive an image from that portion of display 14. The output surface of border structure 58 at which that peripheral edge portion of the image is presented may have a curved cross-sectional profile.

During operation, the pixels of display 14 (e.g., pixels 24 of FIG. 3) produce an image. Light from the image passes through layer 56 and layer 20. The central portion of the image on display 14 is visible to viewer 82 through layers 56 and 20. In border structure 58, the portion of the image on display 14 that is overlapped by border structure 58 passes from the input surface on the inwardly facing side of border structure 58 to the corresponding output surface on the outwardly facing side of border structure 58 and subsequently passes through the overlapping portion of layer 20.

Because border structure 58 is formed from image transfer material, the portion of the display image on the input surface of border structure 58 is passed to the output surface of border structure 58 through the fibers, elongated filaments, or other optical structures of the border structure. The outer surface of border structure 58 may be uncovered by any portions of display cover layer 20, or a peripheral portion of display cover layer 20 may cover and protect the outer surface of border structure 58 (as shown in the illustrative configuration of FIG. 8). The image presented on the outwardly facing surface of border structure 58 may be viewed through the transparent material forming overlapping portions of display cover layer 20.

Border structure 58 may have parallel planar input and output surfaces, or border structure 16 may have other suitable shapes (e.g., shapes where the input and/or output surfaces are curved and/or planar, as shown in the example of FIG. 8, where the input and/or output surfaces are parallel and/or are not parallel to each other, etc.). Border structure 58 may have optical structures that are straight (e.g., vertical or parallel to the surface normal of display 14, as shown in the example of FIG. 8), that have a single bend, that have two bends, and/or that have more than two bends.

During operation of display 14, image light from display 14 passes through layers 58 and 20 and through structure 58 for viewing by a user such as viewer 82 who is viewing device 10 in direction 84 (e.g., a user who is viewing device 10 straight on in a direction parallel to the surface normal of a planar central portion of display 14, a user who is viewing device 10 at an off-axis viewing angle such as at a 45° angle to the surface normal of a planar central portion of display 14, or a user who is viewing device 10 in other directions).

Border structure 58 may be formed from image transport layer material such as a coherent fiber bundle or other elongated optical features. In configurations in which structure 58 is a coherent fiber bundle, elongated structures 58F may be optical fibers. In configurations in which structure 58 is formed from Anderson localization material, structures 58F may be a group of filaments that have different refractive index values. Anderson localization material is characterized by transversely random refractive index features (e.g., higher index regions and lower index regions or regions of three or more or four or more different respective refractive indices) with a lateral size of about 300-500 nm, at least 100 nm, at least 700 nm, at least 1 micron, less than 5 microns, less than 1.5 microns, less than two wavelengths, or other suitable lateral size that are configured to exhibit two-dimensional transverse Anderson localization of light (e.g., the light output from the display of device 10). These refractive index variations are longitudinally invariant along the direction of light propagation and are generally perpendicular to the surface normal of a layer of Anderson localization material (e.g., the refractive index variations have filamentary shapes that run from the lower input surface of structure 58 of FIG. 8 to the upper output surface of structure 58 of FIG. 8), as illustrated by structures 58F. In some configurations, elongated optical structures in border structure 58 (e.g., the fibers in a coherent fiber bundle or the filaments in an Anderson localization material) may have one or more bends and/or other distortions (e.g., as shown by structures 58F of FIG. 9).

Image transport material such as Anderson localization material and coherent fiber bundle material can be used to form strips that run along the periphery of display 14 (e.g., border structure 58). Border structure 58 may be formed from a layer of image transport material with a thickness of at least 0.2 mm, at least 0.5 m, at least 1 mm, at least 2 mm, at least 5 mm, less than 20 mm, less than 10 mm, or other suitable thickness. Anderson localization material and coherent fiber bundle material may also be used to form other image transport structures in device 10 (e.g., straight and/or bent elongated light pipes, spherical shapes, cones, tapered shapes, etc.). As shown in FIG. 8, the surfaces of image transport layer structures such as structure 58 may be planar and/or may have curved cross-sectional profiles (e.g., the edges of device 10 may have rounded outer surfaces). These surfaces may be formed by performing operations such as molding operations, slicing operations, grinding operations, and polishing operations on blocks of image transport layer material.

As shown in FIG. 8, display 14 may have active portion 14A, inactive portion 14B, and curved portion 14C between active portion 14A and inactive portion 14B. Active portion 14A of display 14 may include an array of pixels (e.g., pixels 24 of FIG. 3) for displaying images.

Portion 14B may be bent behind portion 14A and may be secured to the underside of portion 14A using layers such as layers 40 and 42 (similar to the arrangement of FIG. 4).

As in the example of FIG. 4, it may be desirable to use a more flexible material (e.g., having a relatively low modulus of elasticity) between cover layer 20 and display 14 so that impact events on cover layer 20 are absorbed in the flexible material and do not damage display 14. On the other hand, it may be desirable to use a more rigid material (e.g., having a relatively high modulus of elasticity) between cover layer 20 and housing 12 so that mechanical stresses from impact events are absorbed by housing 12 and not by display 14.

In the example of FIG. 8, display support structures include encapsulant 38 having a first elasticity modulus E1 and encapsulant 60 having a second elasticity modulus E4, which may be greater than E1. Both encapsulant 38 and encapsulant 60 form part of the stack of layers that couple display cover layer 20 to housing ledge 12L. A layer of adhesive such as adhesive 62 may be used to attach encapsulants 38 and 60 to housing ledge 12L. If desired, adhesive 62 may be formed from a material having a relatively low modulus of elasticity to serve as a shock absorber. The use of adhesive is merely illustrative, however. If desired, adhesive 62 may be replaced or supplemented by other attachment structures such as welds, solder, screws, clips, rivets, or other fasteners, overmolded plastic, or other connection mechanisms.

Encapsulant material 60 (sometimes referred to as potting material, encapsulation, molding, etc.) may be formed from molded polymer (e.g., injection-molded plastic, transfer molded plastic, low-pressure molded plastic, low-pressure molded plastic, reaction molded plastic, two-part molded plastic, etc.) that has been molded around one or more sides of display 14, may be formed from polymer that is used as a gap fill, may be formed from molded polymer that is pre-formed into the desired shape and subsequently attached to display 14, and/or may be formed using other suitable methods. Illustrative materials that may be used to form encapsulant material 48 include epoxy, polyamide, polyurethane, silicone, other suitable materials, or a combination of any two or more of these materials. Encapsulant material 60 may completely or partially surround display 14.

Because encapsulant material 60 is more rigid than encapsulant material 38, encapsulant material 60 may help ensure that mechanical stresses on cover layer 20 are transferred to housing 12 and/or shock-absorbing adhesive 62 through material 60 and not through display 14. As shown in FIG. 8, there is a greater distance between display 14 and cover layer 20 than between encapsulant material 60 and cover layer 20, which also helps ensure that shocks to cover layer 20 are transferred through encapsulant material 60 and not display 14. Because encapsulant 38 is formed using a soft material (e.g., a material with a low elasticity modulus), encapsulant 38 may help absorb mechanical stresses on cover layer 20, thereby protecting underlying layers of display 14.

As shown in FIG. 8, display 14 extends into and may form part of the stack of layers that attach cover layer 20 to the sidewalls of housing 12 (e.g., to housing sidewall ledge 12L). Portion 38-1 of encapsulant 38 is interposed between display portion 14A and cover layer 20. Portion 38-2 of encapsulant 38 is interposed between display portion 14B and housing ledge 12L. By extending display 14 so that it overlaps housing sidewall ledges 12L, the active area of display 14 may extend closer to the outer edges of device 10 and the inactive border region may be reduced or eliminated.

Encapsulant materials 38 and 60 may extend around one or more sides of display 14. In one suitable arrangement, soft encapsulant material 38 extends along all four edges of the display and across the center of display 14, and rigid encapsulant material 60 forms a ring or loop (e.g., a rectangular ring or loop) that surrounds the outer periphery of soft encapsulant material 38. The combination of rigid and soft materials between cover layer 20 and housing sidewall ledge 12L helps increase the robustness of display 14 while also expanding the active area of the display 14. This is, however, merely illustrative. If desired, encapsulant material 38 may only be located along the outer edges of display 14 and may not extend across the center of the display.

Figure 9:
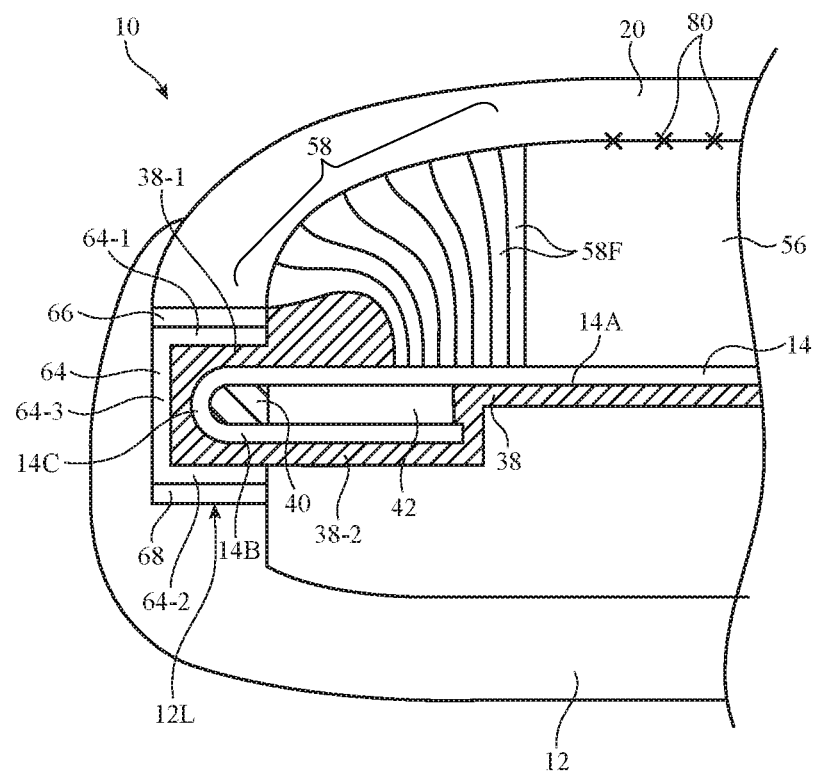
FIG. 9 is a cross-sectional side view of an illustrative electronic device having image transport material and display support structures such as an encapsulation layer and a frame member in accordance with an embodiment.

FIG. 9 is a cross-sectional side view of another illustrative arrangement that may be used for a display that includes image transport material. In the example of FIG. 9, border structure 58 includes elongated optical structures 58F having one or more bends. This is, however, merely illustrative. If desired, optical structures 58F may be straight (as shown in the example of FIG. 8).

As shown in FIG. 9, display 14 may have active portion 14A, inactive portion 14B, and curved portion 14C between active portion 14A and inactive portion 14B. Active portion 14A of display 14 may include an array of pixels (e.g., pixels 24 of FIG. 3) for displaying images.

Portion 14B may be bent behind portion 14A and may be secured to the underside of portion 14A using layers such as layers 40 and 42 (similar to the arrangement of FIG. 4).

As in the example of FIG. 4, it may be desirable to use a more flexible material (e.g., having a relatively low modulus of elasticity) between cover layer 20 and display 14 so that impact events on cover layer 20 are absorbed in the flexible material and do not damage display 14. On the other hand, it may be desirable to use a more rigid material (e.g., having a relatively high modulus of elasticity) between cover layer 20 and housing 12 so that mechanical stresses from impact events are absorbed by housing 12 and not by display 14.

In the example of FIG. 9, display support structures include encapsulant 38 having a first elasticity modulus E1 and frame member 64 having a second elasticity modulus E5, which may be greater than E1. Both encapsulant 38 and frame member 64 form part of the stack of layers that attach and/or couple display cover layer 20 to housing ledge 12L.

A layer of adhesive such as adhesive 68 may be used to attach frame member 64 to housing ledge 12L. An additional layer of adhesive such as adhesive 66 may be used to attach frame member 64 to cover layer 20. If desired, adhesive 68 and/or adhesive 66 may be formed from a material having a relatively low modulus of elasticity to serve as a shock absorber. The use of adhesive is merely illustrative, however. If desired, adhesive 66 and/or adhesive 68 may be replaced or supplemented by other attachment structures such as welds, solder, screws, clips, rivets, or other fasteners, overmolded plastic, or other connection mechanisms.

Frame member 64 (sometimes referred to as a support structure) may be formed from plastic, metal, glass, ceramic, fiber-based materials, other materials, or combinations of these materials. As shown in FIG. 9, frame member 64 may have a C-shaped cross-section and may include a first portion 64-1 interposed between cover layer 20 and encapsulant material 38, a second portion 64-2 interposed between encapsulant material 38 and housing ledge 12L, and a third portion 64-3 that extends vertically between cover layer 20 and housing ledge 12L. If desired, one or both of horizontal portions 64-1 and 64-2 of frame member 64 may overlap a portion of display 14. Frame member 64 may completely or partially surround display 14. The C-shaped geometry of frame member 64 shown in FIG. 9 is merely illustrative. If desired, frame member 64 may have other cross-sectional shapes (e.g., a curved cross-sectional shape, a cross-sectional shape in which one or both of horizontal portions 64-1 and 64-2 are omitted, etc.).

Because frame member 64 is more rigid than encapsulant material 38, frame member 64 may help ensure that mechanical stresses on cover layer 20 are transferred to housing 12 and/or shock-absorbing adhesive 68 through frame member 64 and not through display 14. As shown in FIG. 9, there is a greater distance between display 14 and cover layer 20 than between frame member 64 and cover layer 20, which also helps ensure that shocks to cover layer 20 are transferred through frame member 64 and not display 14.

As shown in FIG. 9, display 14 extends into (and therefore forms part of) the stack of layers that attach cover layer 20 to the sidewalls of housing 12 (e.g., to housing sidewall ledge 12L). Portion 38-1 of encapsulant 38 is interposed between display portion 14A and upper portion 64-1 of frame member 64. Portion 38-2 of encapsulant 38 is interposed between display portion 14B and lower portion 64-2 of frame member 64. By extending display 14 so that it overlaps housing sidewall ledges 12L, the active area of display 14 may extend closer to the outer edges of device 10 and the inactive border region may be reduced or eliminated.

Encapsulant material 38 and frame member 64 may extend around one or more sides of display 14. In one suitable arrangement, soft encapsulant material 38 extends along all four edges of the display and across the center of display 14, and rigid frame member 64 forms a ring or loop (e.g., a rectangular ring or loop) that surrounds the outer periphery of soft encapsulant material 38. The combination of rigid and soft materials between cover layer 20 and housing sidewall ledge 12L helps increase the robustness of display 14 while also expanding the active area of the display 14. This is, however, merely illustrative. If desired, encapsulant material 38 may only be located along the outer edges of display 14 and may not extend across the center of the display.

Figure 10:
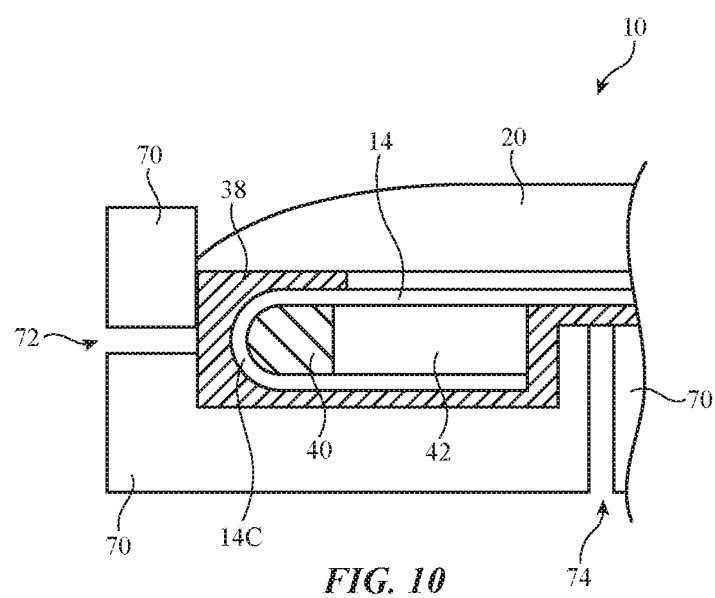
FIG. 10 is a cross-sectional side view of illustrative equipment that may be used to mold display support structures in accordance with an embodiment.

FIG. 10 is a cross-sectional side view of illustrative equipment that may be used to form support structures around display 14. As shown in FIG. 10, electronic device components such as display 14 and cover layer 20 may be placed in mold 70. Molten plastic may be injected through openings in mold 70 such as openings 72. The molten plastic may fill gaps around display 14 to form encapsulant 38. Mold 70 may include one or more exit holes such as exit hole 74 for allowing excess plastic to escape from mold 70. If desired, mold 70 may have different surface geometries to impart the desired surface geometry onto encapsulant 38 (e.g., to impart attachment features such as edge shapes of the type shown in FIGS. 6 and 7 and/or to impart other surface geometries).

The example of FIG. 10 is merely illustrative. If desired, other processing techniques may be used to form encapsulant 38 around display 14.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
   a display layer having an edge portion and comprising a pixel array that extends onto the edge portion;
   a cover layer overlapping the display layer and having a lower surface;
   a housing having a housing sidewall with an upper surface that is parallel to the lower surface of the cover layer; and
   an encapsulant injection molded onto at least the edge portion of the display layer, wherein the encapsulant and the edge portion of the display layer are sandwiched between the lower surface of the cover layer and the upper surface of the housing sidewall, and wherein the encapsulant adheres to the cover layer to couple the cover layer to the upper surface of the housing sidewall.

2. The electronic device defined in claim 1 wherein the encapsulant comprises a first portion interposed between the display layer and the cover layer and a second portion interposed between the display layer and the upper surface of the housing sidewall.

3. The electronic device defined in claim 1 further comprising an additional encapsulant that at least partially surrounds an outer periphery of the encapsulant.

4. The electronic device defined in claim 3 wherein the encapsulant and the additional encapsulant are interposed between the cover layer and the housing sidewall.

5. The electronic device defined in claim 3 wherein the encapsulant has a first elasticity modulus and the additional encapsulant has a second elasticity modulus that is higher than the first elasticity modulus.

6. The electronic device defined in claim 5 wherein a first distance between the display layer and the cover layer is greater than a second distance between the additional encapsulant and the cover layer.

7. The electronic device defined in claim 5 further comprising an adhesive that attaches the encapsulant and the additional encapsulant to the housing sidewall.

8. The electronic device defined in claim 1 wherein the encapsulant comprises a chamfered edge that mates with a chamfered edge of the housing sidewall.

9. The electronic device defined in claim 1 wherein the encapsulant comprises a stepped edge that mates with a stepped edge of the housing sidewall.

10. The electronic device defined in claim 1 wherein the encapsulant is surrounded by a C-shaped frame member that couples the cover layer to the housing sidewall.

11. The electronic device defined in claim 1 wherein the display layer comprises first and second planar portions and a curved portion between the first and second planar portions, the electronic device further comprising a foam adhesive interposed between the first and second planar portions of the display layer.

12. The electronic device defined in claim 1 further comprising an image transport material interposed between the display layer and the cover layer, wherein the image transport material has an input surface and an output surface and transports at least part of an image generated by the display layer from the input surface to the output surface.

13. An electronic device, comprising:
- a housing having a housing sidewall with an upper surface;
- a display layer comprising pixels and having a flat portion and a curved portion that bends behind the flat portion, wherein the pixels extend to an edge of the flat portion;
- a transparent cover layer overlapping the display layer and having a lower surface;
- an encapsulant material that is injection molded onto the curved portion and the edge of the flat portion of the display layer and that adheres to the transparent cover layer to couple the transparent cover layer to the housing sidewall, wherein the encapsulant material and the curved portion of the display layer are sandwiched between the upper surface of the housing sidewall and the lower surface of the transparent cover layer; and
- an adhesive that attaches the encapsulant material to the housing sidewall.

14. The electronic device defined in claim 13 wherein the encapsulant material and the curved portion of the display layer are interposed between the transparent cover layer and the housing sidewall.

15. The electronic device defined in claim 13 further comprising a rectangular frame member that surrounds an outer periphery of the encapsulant material, wherein the rectangular frame member is interposed between the transparent cover layer and the housing sidewall.

16. The electronic device defined in claim 13 further comprising an image transport material interposed between the transparent cover layer and the display layer, wherein the image transport material comprises an input surface, an output surface, and straight, elongated optical structures that transport at least part of an image generated by the display layer from the input surface to the output surface.

17. An electronic device, comprising:
- a display cover layer having a lower surface;
- a housing having a housing ledge with an upper surface that supports the display cover layer and that is parallel to the lower surface of the display cover layer;
- a display layer comprising an edge portion and a pixel array that extends onto the edge portion, wherein the display layer displays images through the display cover layer and overlaps the housing ledge; and
- first and second materials that adhere to the cover layer to couple the cover layer to the upper surface of the housing ledge, wherein the first and second materials and an edge of the display layer are sandwiched between the lower surface of the display cover layer and the upper surface of the housing ledge, wherein the first material is injection molded onto the edge portion of the display layer, and wherein the first material has a first elastic modulus and the second material has a second elastic modulus that is higher than the first elastic modulus.

18. The electronic device defined in claim 17 wherein the second material is molded around an outer perimeter of the first material.

19. The electronic device defined in claim 17 wherein the display layer has a curved portion, wherein the first material encapsulates at least part of the curved portion, wherein the second material has first and second portions that overlap the curved portion, wherein the first portion is attached to the display cover layer with a first adhesive, and wherein the second portion is attached to the housing ledge with a second adhesive.

* * * * *